United States Patent
RoyChowdhury et al.

(10) Patent No.: US 9,836,603 B2
(45) Date of Patent: Dec. 5, 2017

(54) SYSTEMS AND METHODS FOR AUTOMATED GENERATION OF GENERIC SIGNATURES USED TO DETECT POLYMORPHIC MALWARE

(71) Applicant: Symantec Corporation, Mountain View, CA (US)

(72) Inventors: Ajitesh RoyChowdhury, Tripura (IN); Anudeep Kumar, Pradesh (IN); Himanshu Dubey, Pradesh (IN); Nitin Shekokar, Pune (IN)

(73) Assignee: Symantec Corporation, Mountain View, CA (US)

( * ) Notice: Subject to any disclaimer, the term of this patent is extended or adjusted under 35 U.S.C. 154(b) by 176 days.

(21) Appl. No.: 15/041,043

(22) Filed: Feb. 11, 2016

(65) Prior Publication Data
US 2017/0193229 A1    Jul. 6, 2017

(51) Int. Cl.
G06F 11/00    (2006.01)
G06F 21/56    (2013.01)

(52) U.S. Cl.
CPC ...... *G06F 21/564* (2013.01); *G06F 2221/034* (2013.01)

(58) Field of Classification Search
CPC .......................... G06F 21/564; G06F 2221/034
USPC .......................................................... 726/23
See application file for complete search history.

(56) References Cited

U.S. PATENT DOCUMENTS 7,647,622 B1    1/2010  Sobel et al.
7,809,670 B2 *  10/2010 Lee ....................... G06F 21/564
                                                        706/59
8,181,251 B2    5/2012  Kennedy
8,280,830 B2    10/2012 Kennedy
8,464,345 B2    6/2013  Satish et al.
8,478,708 B1    7/2013  Larcom
8,479,291 B1 *  7/2013  Bodke ................... G06F 21/562
                                                        713/188
8,635,171 B1    1/2014  Kennedy
(Continued)

OTHER PUBLICATIONS

Sourabh Satish; Systems and Methods for Updating Generic File-Classification Definitions; U.S. Appl. No. 14/210,364, filed Mar. 13, 2014.
(Continued)

*Primary Examiner* — Teshome Hailu
(74) *Attorney, Agent, or Firm* — FisherBroyles, LLP

(57) ABSTRACT

The disclosed computer-implemented method for automated generation of generic signatures used to detect polymorphic malware may include (1) clustering a set of polymorphic file samples that share a set of static attributes in common with one another, (2) computing a distance of the polymorphic file samples from a centroid that represents a reference data point with respect to the set of polymorphic file samples, (3) determining that the distance of the polymorphic file samples from the centroid is below a certain threshold, and then upon determining that the distance is below the certain threshold, (4) identifying, within the set of static attributes shared in common by the polymorphic file samples, a subset of static attributes whose values are identical across all of the polymorphic file samples and (5) generating a generic file-classification signature from the subset of static attributes. Various other methods, systems, and computer-readable media are also disclosed.

17 Claims, 8 Drawing Sheets

(56) References Cited

U.S. PATENT DOCUMENTS

| | | | |
|---|---|---|---|
| 8,776,168 | B1 | 7/2014 | Gibson et al. |
| 8,949,674 | B2* | 2/2015 | Mancoridis ............ G06F 11/008 714/26 |
| 2005/0120242 | A1 | 6/2005 | Mayer et al. |
| 2007/0136455 | A1* | 6/2007 | Lee ....................... G06F 21/564 709/223 |
| 2010/0083376 | A1 | 4/2010 | Pereira et al. |
| 2010/0162395 | A1 | 6/2010 | Kennedy |
| 2011/0055123 | A1 | 3/2011 | Kennedy |
| 2011/0271341 | A1 | 11/2011 | Satish et al. |
| 2011/0283361 | A1 | 11/2011 | Perdisci et al. |
| 2011/0314545 | A1* | 12/2011 | Michlin ................ G06F 21/564 726/23 |
| 2012/0017275 | A1* | 1/2012 | Harmonen .............. G06F 21/56 726/24 |
| 2012/0084859 | A1* | 4/2012 | Radinsky ................ G06F 21/56 726/23 |
| 2012/0144492 | A1 | 6/2012 | Griffin et al. |
| 2013/0097701 | A1 | 4/2013 | Moyle et al. |
| 2013/0097706 | A1* | 4/2013 | Titonis .................... G06F 21/56 726/24 |
| 2014/0201208 | A1 | 7/2014 | Satish et al. |
| 2015/0040223 | A1* | 2/2015 | Tobin ..................... G06F 21/56 726/23 |
| 2015/0172303 | A1 | 6/2015 | Humble et al. |

OTHER PUBLICATIONS

Petrus Johannes Viljoen, et al.; Systems and Methods for Improving the Classification Accuracy of Trustworthiness Classifiers; U.S. Appl. No. 14/836,991, filed Aug. 27, 2015.

Kirat, Dhilung et al., "SigMal: A Static Signal Processing Based Malware Triage", ACSAC '13, Proceedings of the 29th Annual Computer Security Applications Conference, New Orleans, Louisiana, (Dec. 9-13, 2013), pp. 89-98.

Wicherski, Georg, "peHash: A Novel Approach to Fast Malware Clustering", https://www.usenix.org/legacy/event/leet09/tech/full_papers/wicherski/wicherski.pdf, as accessed Nov. 17, 2015, (2009).

Newsome, James et al., "Polygraph: Automatically Generating Signatures for Polymorphic Worms", http://repository.cmu.edu/cgi/viewcontent.cgi?article=1028&context=ece, as accessed Nov. 17, 2015, (2005).

Rouse, Margaret, "polymorphic malware", http://searchsecurity.techtarget.com/definition/polymorphic-malware, as accessed Nov. 17, 2015, (Apr. 19, 2007).

Mark Kennedy, et al.; Automatic Generation of Generic File Signatures; U.S. Appl. No. 14/481,763, filed Sep. 9, 2014.

Rieck, Konrad et al., "Automatic Analysis of Malware Behavior using Machine Learning", Journal of Computer Security, (2011), pp. 1-30.

Gandotra, Ekta et al., "Malware Analysis and Classification: A Survey", Journal of Information Security, 2014, 5, (Apr. 2014), pp. 56-64.

Morovati, Kamran et al., "Malware Detection Through Decision Tree Classifier", CSEE 2013, (2013), pp. 190-196.

Yufei Han, et al; Systems and Methods for Evaluating Infection Risks Based on Profiled User Behaviors; U.S. Appl. No. 15/188,956, filed Jun. 21, 2016.

Yves Grandvalet and Yoshua Bengio, Semi-supervised Learning by Entropy Minimization, Proceedings of Advances in Neural Information Processing Systems, NIPS 2004, Vancouver. 2004.

Boaz Nadler and Nathan Srebro, Semi-supervised Learning with the Graph Laplacian: the limit of infinite unlabeled data, Proceedings of Advances in Neural Information Processing Systems, NIPS 2009, USA. 2009.

Naoki Abe, Bianca Zadrozny and John Langford, Outlier detection by active learning, Proceedings of the 12th ACM SIGKDD international conference on Knowledge discovery and data mining, 2006, PA, USA. 2006.

T.Lane. A Decision-Theoretic, Semi-Supervised Model for Intrusion Detection, Machine Learning and Data Mining for Computer Security, Springer London. 2006.

Canali, Davide et al.; On the Effectiveness of Risk Prediction Based on Users Browsing Behavior; ASIA CCS'14, Kyoto, Japan; Jun. 4-6, 2014.

Leylya Yumer, et al; Systems and Methods for Preventing Targeted Malware Attacks; U.S. Appl. No. 14/569,302, filed Dec. 12, 2014.

Leylya Yumer; Systems and Methods for Determining Malicious-Download Risk Based on User Behavior; U.S. Appl. No. 14/739,385, filed Jun. 15, 2015.

Aung, Zarni et al., "Permission-Based Android Malware Detection", www.ijstr.org, International Journal of Scientific & Technology Research vol. 2, Issue 3, ISSN 2277-8616, (Mar. 2013), pp. 228-234.

Aung, Zarni et al.; Permission-Based Android Maiware Detection; www.ijstr.org; International Journal of Scientific & Technology Research vol. 2, Issue 3, ISSN 2277-8616; Mar. 2013.

* cited by examiner

```
Static Attributes of Clustered Polymorphic File Samples
                          500

--------------------------------------------------------------------------
**********************************************
Timestamp
Dynamic Link Library
File Size
Number of Sections in File
Checksum
Size of Code
Address Table Size
Debug Directory Size
Load Configuration Table Size
Resource Table Size
Entry Code
App Type
Architecture Type
Mode Type
Entry Section Has Write Property
Last Section Has Executable Property
Last Section Has Write Property
Import Availability
Export Availability
Resource Availability
Relocation Availability
Bound Import Availability
Digital Signature Availability
Rich Header Availability

Subset of Static Attributes
600

----------------------------------------------------------------------------------
**********************************************

Timestamp
File Size
Number Of Sections In File
Size Of Code
Address Table Size
Resource Table Size
Entry Code
App Type
Architecture Type
Mode Type
Entry Section Has Write Property
Last Section Has Executable Property
Last Section Has Write Property
Import Availability
Resource Availability
Relocation Availability
Digital Signature Availability
Rich Header Availability

SYSTEMS AND METHODS FOR AUTOMATED GENERATION OF GENERIC SIGNATURES USED TO DETECT POLYMORPHIC MALWARE

BACKGROUND

Generic signatures are often used to classify files based at least in part on the files' features. For example, a security software product may apply a generic signature to a file encountered by an end user's computing device. In this example, the security software product may compare various features of the file (such as the file's name, path, size, storage location, source, extension, format, and/or creation date) with the generic signature. By comparing such features with the generic signature, the security software product may be able to fairly accurately classify the file as either clean or malicious.

Unfortunately, traditional generic signatures may still lead to false positives and/or false negatives in certain scenarios. For example, a security software vendor may manually generate a traditional generic signature from a broad set of training data that includes known clean and/or malicious files. As a result, this traditional generic signature may be somewhat predictive in nature, potentially leading to inaccurate results. In one example, the security software vendor may release this traditional generic signature to a security software product running on an end user's computing device. In this example, the security software product may misdiagnose certain clean files encountered by the end user's computing device as polymorphic malware by applying the traditional generic signature.

The instant disclosure, therefore, identifies and addresses a need for systems and methods for automated generation of generic signatures used to detect polymorphic malware.

SUMMARY

As will be described in greater detail below, the instant disclosure describes various systems and methods for automatically generating generic signatures used to detect polymorphic malware by applying very dense clusters of polymorphic file samples as training data.

In one example, a computer-implemented method for automated generation of generic signatures used to detect polymorphic malware may include (1) clustering a set of polymorphic file samples that share a set of static attributes in common with one another, (2) computing a distance of the polymorphic file samples from a centroid that represents a reference data point with respect to the set of polymorphic file samples, (3) determining that the distance of the polymorphic file samples from the centroid is below a certain threshold, and then upon determining that the distance is below the certain threshold, (4) identifying, within the set of static attributes shared in common by the polymorphic file samples, a subset of static attributes whose values are identical across all of the polymorphic file samples and (5) generating a generic file-classification signature from the subset of static attributes.

In one example, the method may also include identifying at least one polymorphic variant that has certain static attributes. In this example, the method may further include determining that certain static attributes of at least one additional polymorphic variant are identical to the certain attributes of the polymorphic variant. In addition, the method may include forming a cluster that includes the polymorphic variant and the additional polymorphic variant in response to determining that the certain attributes of the additional polymorphic variant are identical to the certain attributes of the polymorphic variant.

In one example, the method may also include computing a distance of the polymorphic variant from the centroid. In this example, the method may further include computing an additional distance of the additional polymorphic variant from the centroid. In addition, the method may include determining, based at least in part on the distances of the polymorphic variant and the additional polymorphic variant, a density of the cluster that includes the polymorphic variant and the additional polymorphic variant. Finally, the method may include determining that the density of the cluster satisfies a density threshold indicating that the cluster is qualified for use in generating a generic file-classification signature whose false positive rate is at an acceptable level.

In one example, the method may also include computing, based at least in part on certain static attributes of the polymorphic file samples, a plurality of vectors that represent data points with respect to the centroid. In this example, the method may further include determining that each of the vectors is within a certain numerical value of the centroid.

In one example, the method may also include computing, based at least in part on certain static attributes of the polymorphic file samples, a plurality of vectors that represent data points with respect to the centroid. In this example, the method may further include calculating an average of the vectors. In addition, the method may also include determining that the average of the vectors is within a certain numerical value of the centroid.

In one example, the method may also include determining that the distance of the polymorphic file samples from the centroid is approximately zero. In another example, the method may also include clustering the set of polymorphic file samples on a server. In this example, the method may further include generating the generic file-classification signature on the server. Additionally or alternatively, the method may include distributing the generic file-classification signature to at least one client device via a network to enable the client device to classify at least one polymorphic file sample as malware using the generic file-classification signature by comparing certain static attributes of the polymorphic file with the subset of static attributes.

As another example, a system for implementing the above-described method may include various modules stored in memory and at least one physical processor that executes these modules. In one example, these modules may include and/or represent (1) a clustering module that clusters a set of polymorphic file samples that share a set of static attributes in common with one another, (2) a computation module that computes a distance of the polymorphic file samples from a centroid that represents a reference data point with respect to the set of polymorphic file samples, (3) a determination module that determines that the distance of the polymorphic file samples from the centroid is below a certain threshold, (4) an identification module that identifies, within the set of static attributes shared in common by the polymorphic file samples, a subset of static attributes whose values are identical across all of the polymorphic file samples, and (5) a generation module that generates a generic file-classification signature from the subset of static attributes.

As a further example, the above-described method may be encoded as computer-readable instructions on a non-transitory computer-readable medium. For example, a computer-readable medium may include one or more computer-executable instructions that, when executed by at least one processor of a computing device, may cause the computing device to (1) cluster a set of polymorphic file samples that share a set of static attributes in common with one another, (2) compute a distance of the polymorphic file samples from a centroid that represents a reference data point with respect to the set of polymorphic file samples, (3) determine that the distance of the polymorphic file samples from the centroid is below a certain threshold, (4) identify, within the set of static attributes shared in common by the polymorphic file samples, a subset of static attributes whose values are identical across all of the polymorphic file samples and then (5) generate a generic file-classification signature from the subset of static attributes.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is an illustration of static attributes of clustered polymorphic file samples.

FIG. 6 is an illustration of a subset of static attributes of clustered polymorphic file samples.

Figure 1:
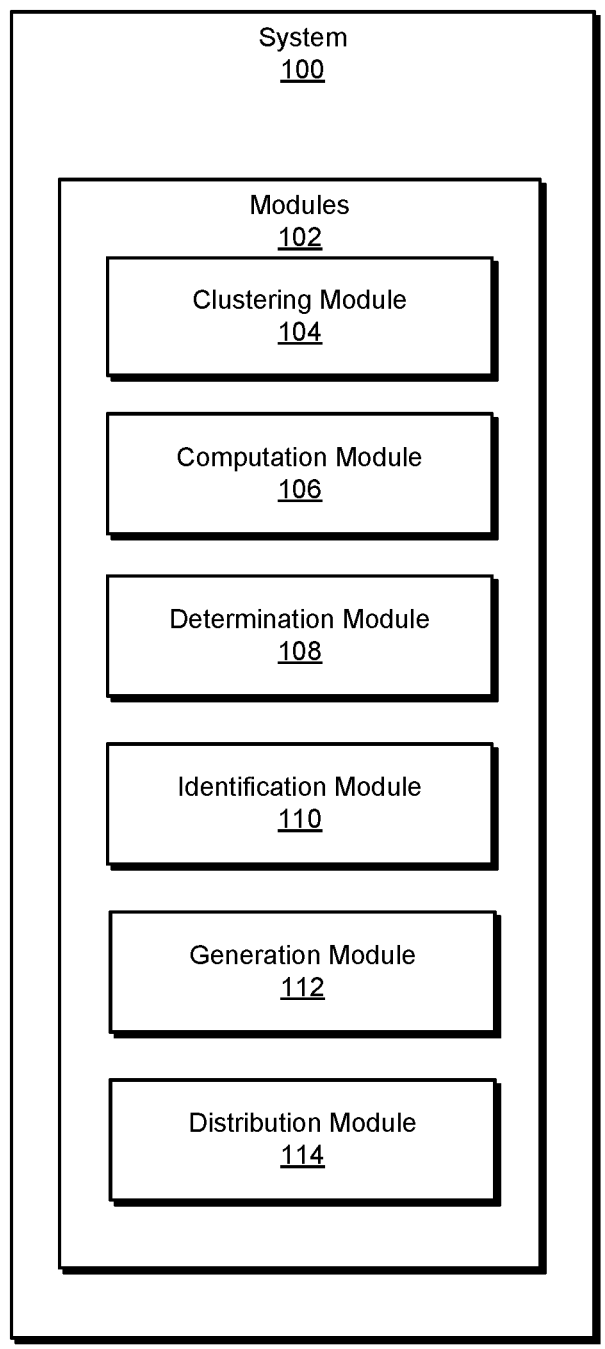
FIG. 1 is a block diagram of an exemplary system for automated generation of generic signatures used to detect polymorphic malware.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for automated generation of generic signatures used to detect polymorphic malware. As will be explained in greater detail below, by identifying and/or grouping highly dense clusters of polymorphic file samples, the various systems and methods described herein may automatically generate generic signatures by using these polymorphic file samples as training data. As an example, the various systems and methods described herein may create a cluster whose polymorphic file samples all have a distance of approximately zero from the cluster's centroid. This zero distance may represent and/or signify that the values of corresponding static attributes of the clustered polymorphic file samples are extremely similar, if not identical, to one another across the cluster.

Continuing with this example, the various systems and methods described herein may select a subset of the static attributes of the clustered polymorphic file samples. This subset may include only static attributes whose values are identical across the clustered polymorphic file samples. For example, the subset may include a file size attribute only if all the file sizes of the polymorphic file samples within the cluster are the same. The various systems and methods described herein may then generate a generic signature based at least in part on the subset of static attributes of the polymorphic file samples within the cluster. By generating the generic signatures in this way, the various systems and methods described herein may improve the efficiency of the process for generating generic signatures, reduce the amount of time needed to generate generic signatures, and/or improve the accuracy and/or false positive rate of generic signatures.

Figure 2:
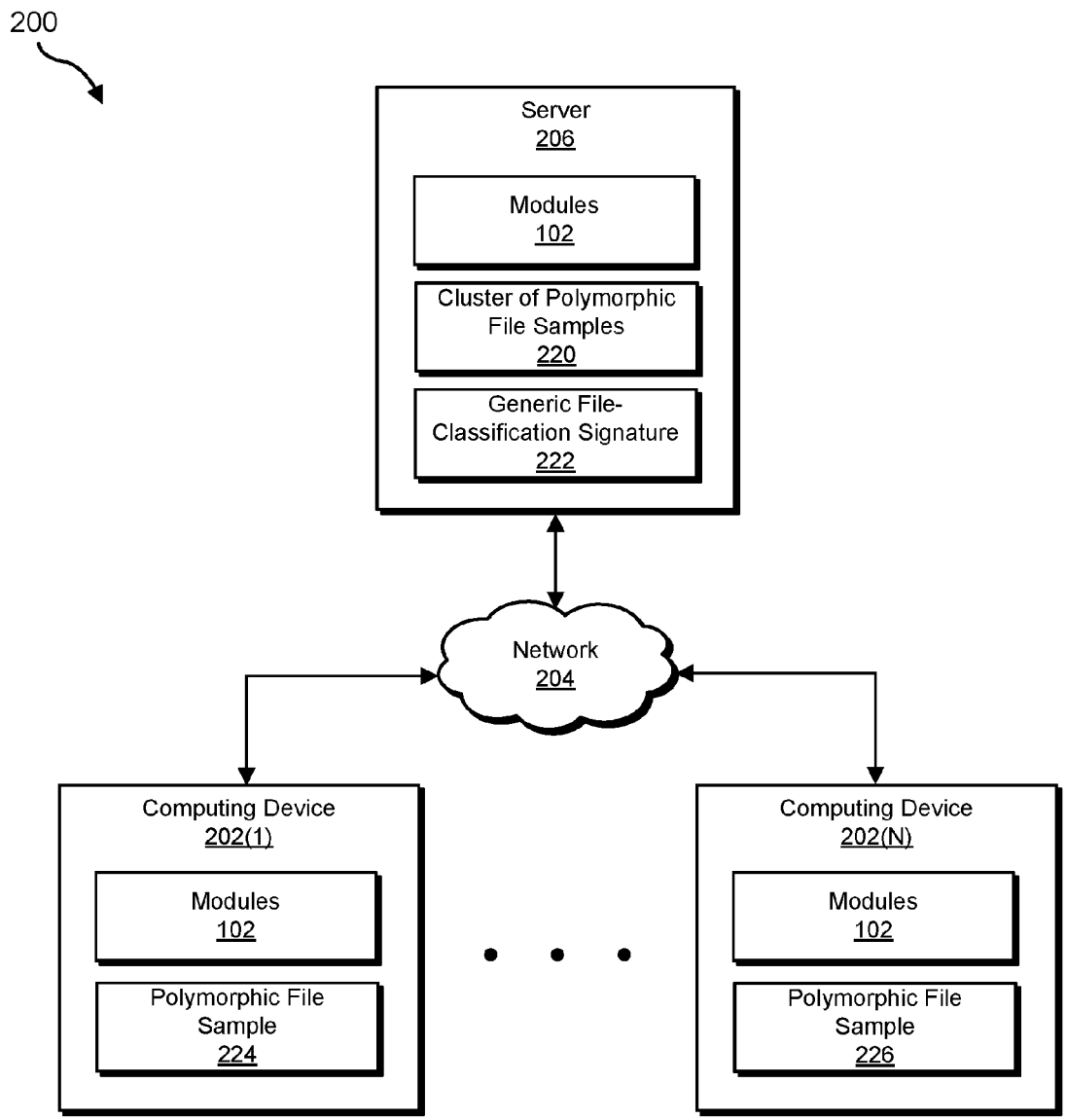
FIG. 2 is a block diagram of an additional exemplary system for automated generation of generic signatures used to detect polymorphic malware.

The following will provide, with reference to FIGS. 1-2, detailed descriptions of exemplary systems for automated generation of generic signatures used to detect polymorphic malware. Detailed descriptions of corresponding computer-implemented methods will be provided in connection with FIG. 3. Detailed descriptions of a cluster of training data that includes polymorphic file samples will be provided in connection with FIG. 4. Detailed descriptions of static attributes of clustered polymorphic file samples and a subset of those static attributes will be provided in connection with FIGS. 5 and 6, respectively. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for automated generation of generic signatures used to detect polymorphic malware. As illustrated in this figure, exemplary system 100 may include one or more modules 102 for performing one or more tasks. For example, and as will be explained in greater detail below, exemplary system 100 may include a clustering module 104 that clusters a set of polymorphic file samples that share a set of static attributes in common with one another. Exemplary system 100 may also include a computation module 106 that computes a distance of the polymorphic file samples from a centroid that represents a reference data point with respect to the set of polymorphic file samples.

In addition, and as will be described in greater detail below, exemplary system 100 may include determination module 108 that determines that the distance of the polymorphic file samples from the centroid is below a certain threshold. Exemplary system 100 may also include an identification module 110 that identifies, within the set of static attributes shared in common by the polymorphic file samples, a subset of static attributes whose values are identical across all of the polymorphic file samples. Exemplary system 100 may further include a generation module 112 that generates a generic file-classification signature from the subset of static attributes. Exemplary system 100 may additionally include a distribution module 114 that distributes the generic file-classification signature to one or more client devices via a network. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing devices 202(1)-(N) in communication with a server 206 via a network 204. In one example, one or more of computing devices 202 may be programmed with one or more of modules 102. In this example, computing device 202(1) may include a polymorphic file sample 224, and computing device 202(N) may include a polymorphic file sample 226.

Additionally or alternatively, server 206 may be programmed with one or more of modules 102. In this example, server 206 may group and/or include a cluster of polymorphic file samples 220 and/or generate a generic file-classification signature 222.

In one embodiment, one or more of modules 102 from FIG. 1 may, when executed by at least one processor of computing devices 202(1)-(N) and/or server 206, enable computing devices 202(1)-(N) and/or server 206 to facilitate automated generation of generic signatures used to detect polymorphic malware. For example, and as will be described in greater detail below, one or more of modules 102 may cause one or more of computing devices 202(1)-(N) and/or server 206 to (1) cluster a set of polymorphic file samples 220 that share a set of static attributes in common with one another, (2) compute a distance of polymorphic file samples 220 from a centroid that represents a reference data point with respect to the cluster, (3) determine that the distance of polymorphic file samples 220 from the centroid is below a certain threshold, (4) identify, within the set of static attributes shared in common by polymorphic file samples 220, a subset of static attributes whose values are identical across all of polymorphic file samples 220 and then (5) generate generic file-classification signature 222 from the subset of static attributes.

Computing devices 202(1)-(N) each generally represent any type or form of computing device capable of reading computer-executable instructions. Examples of computing devices 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, client devices, variations or combinations of one or more of the same, exemplary computing system 710 in FIG. 7, or any other suitable computing devices.

Server 206 generally represents any type or form of computing device capable of clustering polymorphic file samples, generating generic signatures, and/or distributing generic signatures to computing devices within a security software vendor's customer base. Examples of server 206 include, without limitation, security servers, application servers, web servers, storage servers, and/or database servers configured to run certain software applications and/or provide various security, web, storage, and/or database services. Although illustrated as a single element in FIG. 2, server 206 may alternatively include and/or represent multiple servers running within exemplary system 200.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing device 202 and server 206.

Polymorphic file samples 224 and 226 generally represent any portion or entirety of a computer file that changes, mutates, and/or evolves in one way or another over time. In one example, polymorphic file sample 224 may mutate in one way or another over time while keeping its core function and/or purpose intact. For example, a polymorphic file sample 224 may include and/or represent a keylogger whose function remains the same but whose fingerprint and/or hash changes over time. In addition, polymorphic file samples 224 and 226 may include and/or represent different mutations and/or variants of the same malicious file or within the same family of malware. Examples of polymorphic file samples 224 and 226 include, without limitation, executable files, batch files, scripts, binary code, machine code, portions of one or more of the same, variations or combinations of one or more of the same, or any other suitable polymorphic file samples.

Cluster of polymorphic file samples 220 generally represents any set, collection, and/or grouping of polymorphic file samples that share certain static attributes in common with one another. In one example, cluster of polymorphic file samples 220 may be grouped together due at least in part to the values of various static attributes being so similar to one another across the polymorphic file samples in question. In this example, the polymorphic file samples included in cluster 220 may each have a distance from a centroid that is below a certain threshold. As a result, those polymorphic file samples may form a highly dense cluster that is qualified for use in generating a generic file-classification signature with an acceptable false positive rate. Although FIG. 2 illustrates only a single cluster, exemplary system 200 may alternatively include and/or create multiple clusters of polymorphic file samples from various malware families.

Generic file-classification signature 222 generally represents any type or form of model, classifier, and/or definition capable of being used to detect and/or classify different mutations and/or variants of a malicious file. Examples of generic file-classification signature 222 include, without limitation, signatures, definitions, heuristics, classifiers, data clusters, perceptrons, decision trees, variations or combinations of one or of the same, or any other suitable generic file-classification signature. The term "generic," as used herein in connection with a signature, generally refers to the signature's structure being based on features and/or attributes, as opposed to being based on a fingerprint and/or hash. As a result, generic file-classification signature 222 may have the ability to detect and/or classify different file mutations and/or variants whose fingerprints and/or hashes are distinct from one another.

Figure 3:
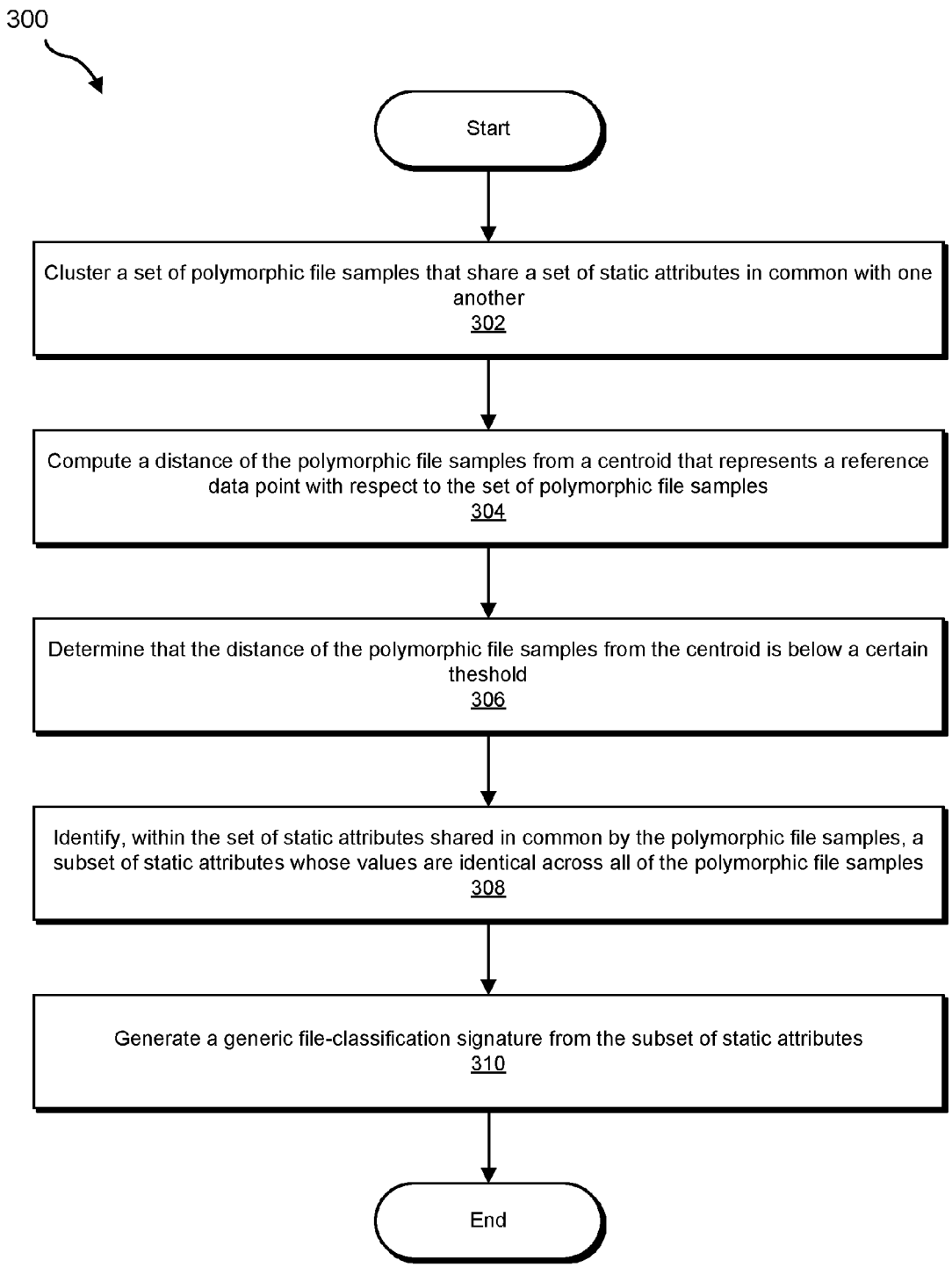
FIG. 3 is a flow diagram of an exemplary method for automated generation of generic signatures used to detect polymorphic malware.

FIG. 3 is a flow diagram of an exemplary computer-implemented method 300 for automated generation of generic signatures used to detect polymorphic malware. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may cluster a set of polymorphic file samples that share a set of static attributes in common with one another. For example, clustering module 104 may, as part of server 206 in FIG. 2, cluster polymorphic file samples that share a set of static attributes in common with one another. This clustering process may result in the formation and/or creation of cluster of polymorphic file samples 220. In one example, cluster of polymorphic file samples 220 may include polymorphic file sample 224 and/or polymorphic file sample 226. In this example, some of the static attributes may include and/or represent Malheur attributes (such as GVM attributes).

Examples of such static attributes include, without limitation, the name of a file sample, the size of a file sample, the storage location of a file sample, the source computing device that hosts a file sample, the file extension of a file sample, the file format of a file sample, the creation date and/or time of a file sample, the number of functions imported by a file sample, dynamic link libraries of a file sample, the number of sections of a file sample, the checksum of a file sample, the address table of a file sample, the debug directory size of a file sample, the load configuration table size of a file sample, the resource table size of a file sample, the entry code of a file sample, the app type of a file sample, the architecture type of a file sample, the mode type of a file sample, whether the entry section has a write property, whether the last section has an executable property, whether the last section has a write property, import availability, export availability, resource availability, relocation availability, bound import availability, digital signature availability, rich header availability, variations or combinations of one or more of the same, or any other suitable static attributes.

The systems described herein may perform step 302 in a variety of ways. In some examples, clustering module 104 may cluster polymorphic file samples encountered on computing devices 202(1)-(N) within a security software vendor's customer base. For example, computing devices 202(1)-(N) may each execute a security client and/or agent included in a security software product of a security software vendor. In this example, computing devices 202(1)-(N) may each form part of the security software vendor's customer base. Additionally or alternatively, the security clients and/or agents running on computing devices 202(1)-(N) may identify any polymorphic file samples encountered by computing devices 202(1)-(N).

In one example, the security clients and/or agents may send a copy of any of these polymorphic file samples to server 206 via network 204. For example, the security clients and/or agents may send a copy of any polymorphic file samples (such as polymorphic file samples 224 and 226) encountered for the first time within the security software vendor's customer base to server 206. Additionally or alternatively, the security clients and/or agents may send various mutations and/or variants of a malicious file to server 206.

In one example, the security clients and/or agents may derive and/or extract certain file information from polymorphic file samples encountered by computing devices 202(1)-(N) (using, e.g., an attribute collector such as MHAC). In this example, the file information may include, identify, and/or represent various static attributes of the polymorphic file samples. Additionally or alternatively, the security clients and/or agents may create and/or form the file information from pre-computed static attributes available at a samples source (such as SYMCLASS). In any case, the security clients and/or agents may then send a copy of this file information to server 206 via network 206.

In one example, clustering module 104 may cluster the polymorphic file samples together at server 206 using any type or form of clustering algorithm and/or technique. For example, clustering module 104 may apply a K-means and/or K-center algorithm to the polymorphic file samples collected on server 206 by iterating over and/or comparing the static attributes of those polymorphic file samples (using, e.g., MUTANTX). By clustering the polymorphic file samples in this way, clustering module 104 may be able to form and/or cluster 220, which includes and/or represents different mutations and/or variants of the same malicious file or within the same family of malware. Moreover, by performing this clustering operation at server 206, clustering module 104 may be able to utilize the processing power and/or resources of server 206 without bogging down and/or consuming such processing power and/or resources on computing devices 202(1)-(N).

As a specific example, clustering module 104 may obtain file information about polymorphic file sample 224 and polymorphic file sample 226 from computing devices 202(1) and 202(N), respectively. In this example, clustering module 104 may identify polymorphic file sample 224 as a polymorphic variant of a family of malware. Clustering module 104 may then determine that polymorphic file sample 226 is another polymorphic variant from the same family of malware with certain static attributes that are identical to those of polymorphic file sample 224. In response to this determination, clustering module 104 may create and/or form cluster of polymorphic file samples 220 in FIG. 4.

Figure 4:
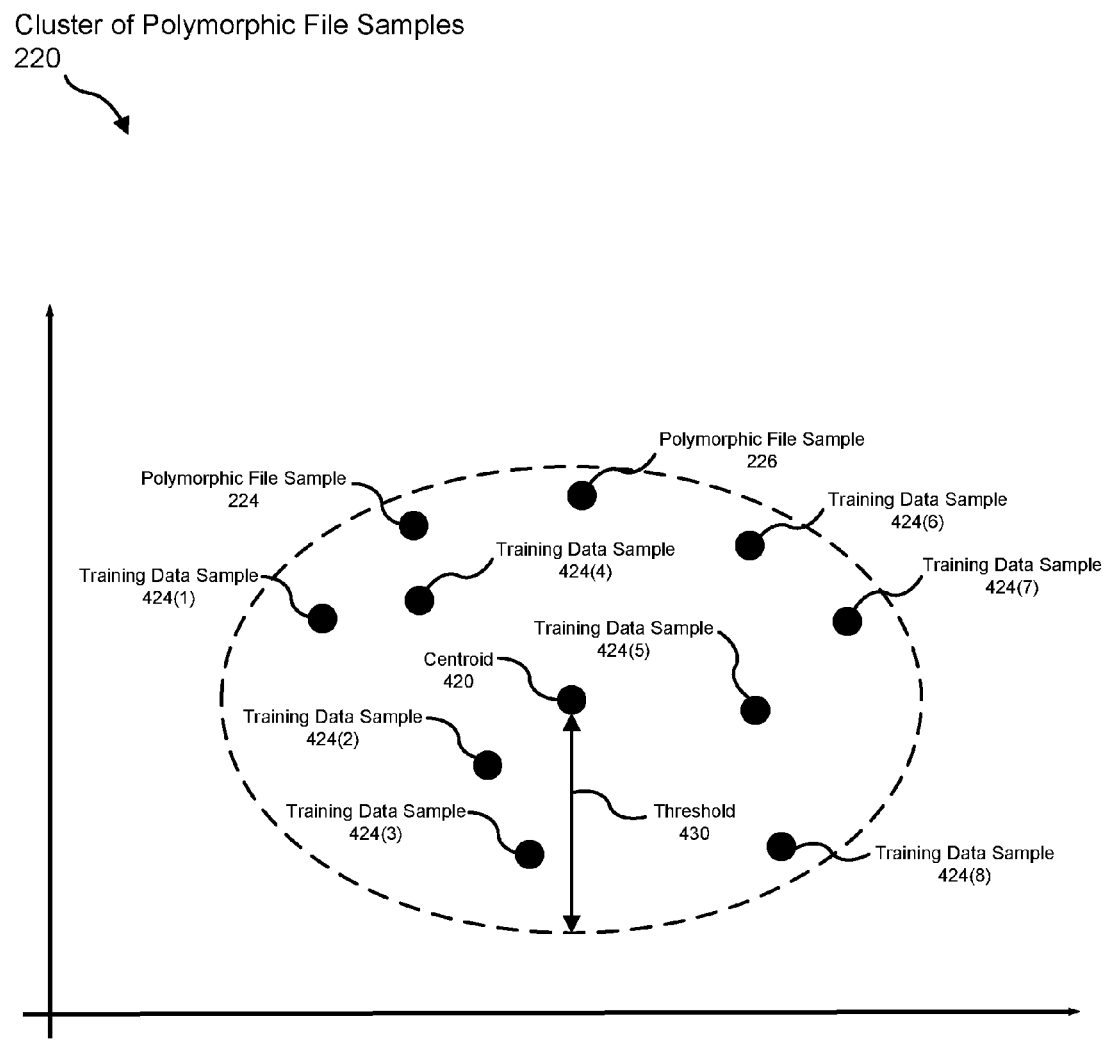
FIG. 4 is an illustration of an exemplary cluster of training data that includes polymorphic file samples.

As illustrated in FIG. 4, cluster of polymorphic file samples 220 may include polymorphic file samples 224 and 226, a centroid 420, training data samples 424(1)-(8), and/or a threshold 430. The term "centroid," as used herein, generally refers to any type or form of reference data point (such as a center point) within a cluster. The term "distance," as used herein, generally refers to any type or form of value, measurement, and/or metric that represents the degree of difference between a training data sample and a centroid within a cluster. In one embodiment, threshold 430 may vary in terms of distance throughout cluster 220. As illustrated in FIG. 4, threshold 430 may create a non-uniform (e.g., oval-shaped) virtual perimeter, as opposed to a uniform (e.g., circular) virtual perimeter, around centroid 420.

The phrase "training data sample," as used herein, generally refers to any type or form of computer data, metadata, and/or information related to a known file. Polymorphic file samples 224 and 226 may constitute and/or represent training data samples included in cluster 220. In one example, polymorphic file samples 224 and 226 may each include and/or represent a mutation and/or variant of a malicious file. In this example, training data samples 424(1)-(8) may each include and/or represent a mutation and/or variant of that same malicious file. Accordingly, cluster 220 may include only polymorphic file samples that represent mutations and/or variants of the same malicious file.

In one example, clustering module 104 may use static attributes 500 in FIG. 5 as the basis for clustering similar polymorphic file samples from the same family of malware. As illustrated in FIG. 5, static attributes 500 may include, identify, and/or represent timestamps, dynamic link libraries, file sizes, the number of file sections, checksums, code sizes, address table sizes, debug directory sizes, load configuration table sizes, resource table sizes, entry codes, app types, architecture types, mode types, whether entry sections have a write property, whether final sections have an executable property, whether final sections have a write property, import availability, export availability, resource availability, relocation availability, bound import availability, digital signature availability, rich header availability, variations or combinations of one or more of the same, or any other suitable static attributes. In some examples, static attributes 500 may include, identify, and/or represent various other attributes that are not illustrated in FIG. 5.

Returning to FIG. 3, at step 304 one or more of the systems described herein may compute a distance of the polymorphic file samples from a centroid that represents a reference data point with respect to the set of polymorphic file samples. For example, computation module 106 may, as part of server 206 in FIG. 2, compute the distance of polymorphic file samples 224 and 226 included in cluster 220 from a centroid (such as centroid 420 in FIG. 4) that represents a reference data point with respect to cluster 220. In one example, this distance may be represented as an average of the distances of all polymorphic file samples included in cluster 220 from the centroid.

The systems described herein may perform step 304 in a variety of ways. In some examples, computation module 106 may compute the distance of each polymorphic file sample within cluster 220 from the centroid and maintain these distances as separate calculations. In one example, computation module 106 may perform these computations using vectors. For example, computation module 106 may compute vectors that represent polymorphic file samples 224 and 226 and/or training data samples 424(1)-(8) with respect of the centroid based at least in part on some or all of their static attributes. These vectors may collectively indicate the overall density of the cluster and/or whether the cluster includes any outliers. The term "vector," as used herein, generally refers to any type or form of sequence and/or representation of data elements and/or components.

In other examples, computation module 106 may compute the distance of the polymorphic file samples from the centroid by averaging the distances of all polymorphic file samples included in cluster 220. For example, computation module 106 may compute a distance of polymorphic file sample 224 from the centroid. Additionally, computation module 106 may compute an additional distance of polymorphic file sample 226 from the centroid. Referring back to the example in FIG. 4, computation module 106 may also compute the distances of all training data samples 424(1)-(8) from centroid 420. Upon computing those distances, computation module 106 may calculate an average of all the distances for use in measuring the overall density of cluster 220. In one example, computation module 106 may perform this calculation using vectors.

Returning to FIG. 3, at step 306 one or more of the systems described herein may determine that the distance of the polymorphic file samples from the centroid is below a certain threshold. For example, determination module 108 may, as part of server 206 in FIG. 2, determine that the distances of polymorphic file samples 224 and 226 from the centroid are below a certain threshold. More specifically, determination module 108 may determine that these distances from the centroid are approximately zero. As a result, determination module 108 may determine that cluster 220 is dense enough to be used to generate a generic file-classification signature whose false positive rate is at an acceptable level.

The systems described herein may perform step 306 in a variety of ways. In some examples, determination module 108 may determine that the distances of all the polymorphic file samples within cluster 220 are below the threshold based at least in part on the density of cluster 220. The term "density," as used herein, generally refers to the degree of compactness of polymorphic file samples within a cluster and/or the closeness of the polymorphic file samples to the centroid and/or center of the cluster.

In one example, determination module 108 may determine the density of cluster 220 based at least in part on the distances of the polymorphic file samples within cluster 220. In this example, determination module 108 may determine that the density of cluster 220 satisfies a density threshold indicating that the cluster is qualified for use in generating a generic file-classification signature whose false positive rate is at an acceptable level. For example, determination module 108 may determine that the vectors corresponding to the polymorphic file samples within cluster 220 all indicate a Euclidean distance that is within "0.0003" from center. Additionally or alternatively, determination module 108 may determine that the average of the vectors within cluster 220 indicates a Euclidean distance that is within "0.0003" from center.

Accordingly, determination module 108 may determine that these distances from the centroid are approximately zero. In other words, determination module 108 may determine that cluster 220 is dense enough to be used to generate a generic file-classification signature whose false positive rate is at an acceptable level. In some examples, the denser the cluster is, the lower the false positive rate may be, and/or the better the resulting generic file-classification signature may perform.

Returning to FIG. 3, at step 308 one or more of the systems described herein may identify, within the set of static attributes shared in common by the polymorphic file samples, a subset of static attributes whose values are identical across all of the polymorphic file samples within the cluster. For example, identification module 110 may, as part of server 206 in FIG. 2, identify a subset of static attributes whose values are identical across all polymorphic file samples within cluster 220. The term "subset of static attributes," as used herein, generally refers to any collection of static attributes that includes less than all of the static attributes from a certain set. In one example, this subset of static attributes may include and/or represent only a portion or part of static attributes 500 in FIG. 5.

The systems described herein may perform step 308 in a variety of ways. In some examples, identification module 110 may identify the subset of static attributes by iterating through some or all of the static attributes used to cluster the polymorphic file samples into cluster 220. For example, identification module 110 may iterate through static attributes 500 for all of the polymorphic file samples within cluster 220 to search for those static attributes whose values are identical to one another. During this search, identification module 110 may identify those static attributes whose values are identical across all of the polymorphic file samples within cluster 220.

In some examples, identification module 110 may select the subset of static attributes from those static attributes whose values are identical across all of the polymorphic file samples within cluster 220. For example, upon identifying those static attributes whose values are identical, identification module 110 may select some but not all of those static attributes as training data for generating and/or training a generic file-classification signature. In this example, the selected static attributes may constitute and/or represent the subset of static attributes used as training data. In addition, the non-selected static attributes may be excluded from use as training data.

As a specific example, identification module 110 may identify subset of static attributes 600 in FIG. 6 as being identical to one another across all of polymorphic file samples 224 and 226 as well as training data samples 424(1)-(8) within cluster 220 in FIG. 4. As illustrated in FIG. 6, subset of static attributes 600 may include, identify, and/or represent timestamps, file sizes, the number of file sections, code sizes, address table sizes, resource table sizes, entry codes, app types, architecture types, mode types, whether entry sections have a write property, whether final sections have an executable property, whether final sections have a write property, import availability, resource availability, relocation availability, digital signature availability, rich header availability, variations or combinations of one or more of the same, or any other suitable subset of static attributes. Accordingly, those attributes included in static attributes 500 but excluded from subset of attributes 600 may not be exactly the same for all of the polymorphic file samples within cluster 220. Alternatively, those attributes included in static attributes 500 but excluded from subset of attributes 600 may not have been selected for use in generating and/or training a generic file-classification signature for cluster 220.

For example, identification module 110 may determine that polymorphic file samples 224 and 226 and training data samples 424(1)-(8) are each 3 megabytes in size. In another example, identification module 110 may determine that polymorphic file samples 224 and 226 and training data samples 424(1)-(8) each have 6 file sections. Additionally or alternatively, identification module 110 may determine that polymorphic file samples 224 and 226 and training data samples 424(1)-(8) are each configured in the x64 architecture.

Returning to FIG. 3, at step 310 one or more of the systems described herein may generate a generic file-classification signature from the subset of static attributes. For example, generation module 112 may, as part of server 206 in FIG. 2, generate generic file-classification signature 222 from the subset of static attributes. In this example, generic file-classification signature 222 may facilitate detecting, classifying, and/or convicting malicious files encountered on client devices within a security software vendor's customer base.

The systems described herein may perform step 310 in a variety of ways. In some examples, generation module 112 may generate file-classification signature 222 by training file-classification signature 222 with training data that includes the subset of static attributes. For example, generation module 112 may apply at least one statistical and/or machine learning algorithm to fit generic file-classification signature 222 to the subset of static attributes. Examples of such a statistical and/or machine learning algorithm include, without limitation, supervised learning algorithms, Lloyd's algorithm, Voronoi interaction, linear regression, the perceptron algorithm, neural networking, regression trees, variations of one or more of the same, combinations of one or more of the same, or any other suitable statistical algorithms.

In one example, generation module 112 may fit generic file-classification signature 222 to the subset of static attributes by accounting for the subset of static attributes within generic file-classification signature 222. For example, generation module 112 may construct a decision tree that corresponds to and/or represents the content identified within subset of training data 122(1). Generation module 112 may update this decision tree in an iterative process and/or on a fairly regular basis to account for new polymorphic file samples and/or new information represented in the subset of static attributes.

In some examples, the systems and methods described herein may distribute generic file-classification signature 222 to client devices within a security software vendor's customer base. For example, distribution module 114 may, as part of server 206, distribute generic file-classification signature 222 to computing devices 202(1)-(N) (and/or certain computing devices not illustrated in FIG. 2) via network 204. By distributing generic file-classification signature 222 in this way, distribution module 114 may enable those computing devices to detect, classify, and/or convict any mutations and/or variants of polymorphic file samples 224 and 226 by comparing certain attributes of such mutations and/or variants with the subset of static attributes represented and/or accounted for in generic file-classification signature 222.

As explained above in connection with FIGS. 1-6, a security software vendor may provide computer security to a variety of client devices within its customer base by generating and/or distributing generic signatures used to detect polymorphic malware. For example, the security software vendor may have a security backend that collects and/or clusters a set of polymorphic file samples that share certain static attributes in common. By performing this clustering operation on the security backend instead of on the client devices, the security software vendor may utilize the processing power and/or resources of the security backend without bogging down and/or consuming such processing power and/or resources on its customers' devices.

In this example, the security backend may compute the Euclidean distances of the polymorphic file samples from the center of the corresponding cluster. In the event that the distances are sufficiently close to the center, the security backend may determine that the cluster is qualified for use in generating a generic signature that has an acceptable false positive rate (e.g., between 0% and 1%). In response, the security backend may identify a subset of the static attributes whose values are the same across all of the polymorphic file samples within the cluster. The security backend may then generate a generic signature from this subset of static attributes. Finally, the security backend may distribute the generic signature to the client devices within the security software vendor's customer base to enable the client devices to classify any mutations and/or variants of the polymorphic file samples encountered using the generic signature.

Figure 7:
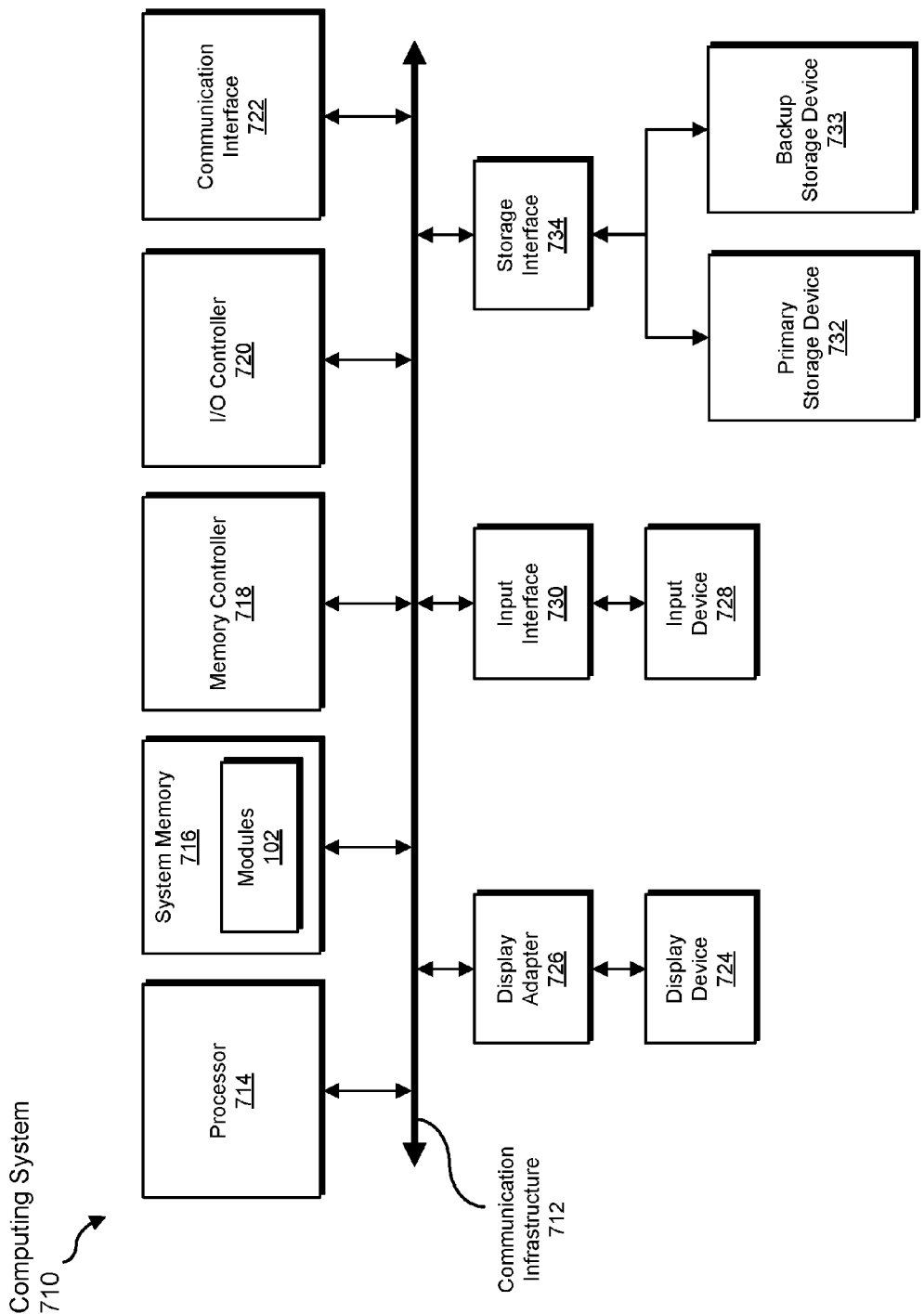
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
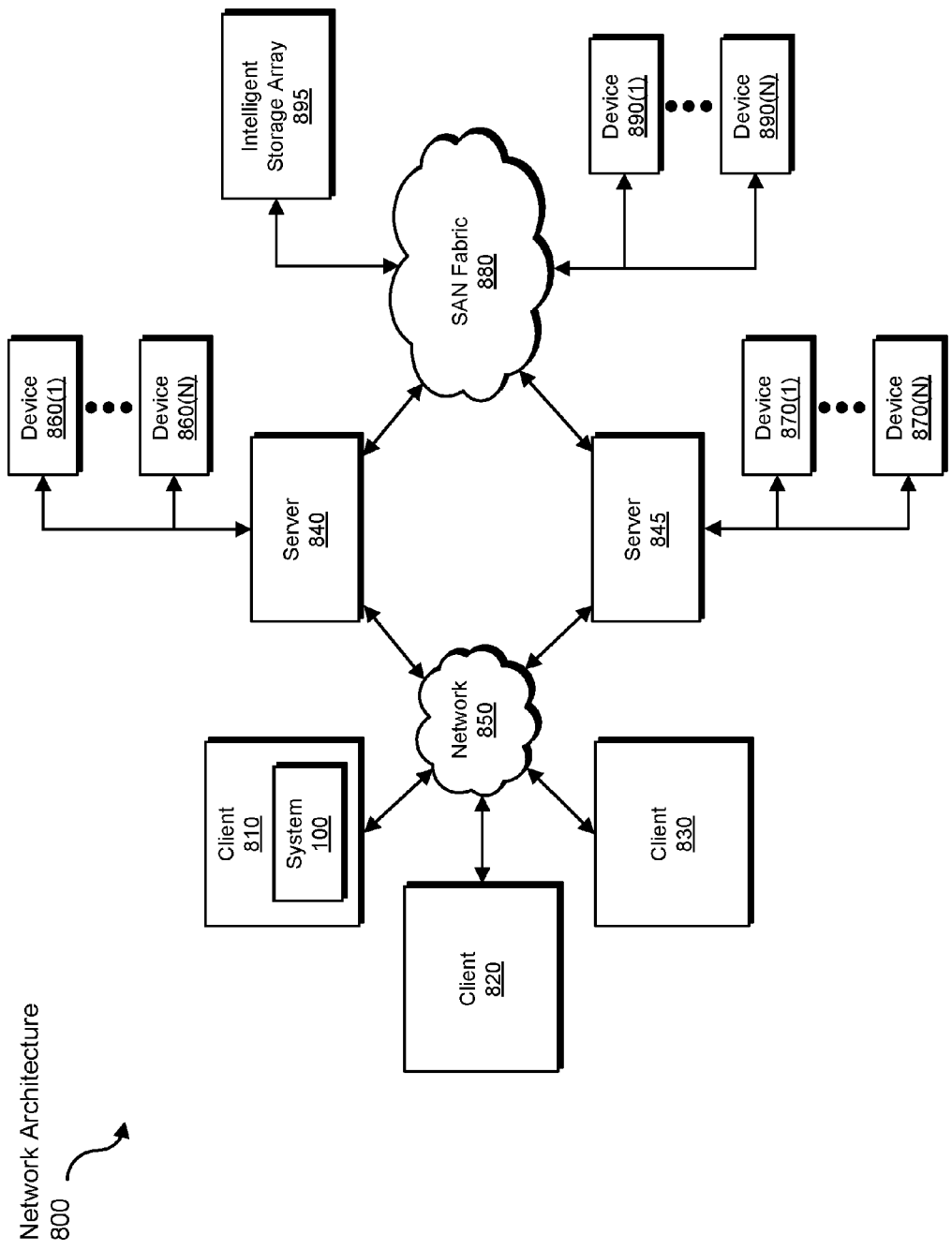
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for automated generation of generic signatures used to detect polymorphic malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for automated generation of generic signatures used to detect polymorphic malware, at least a portion of the method being performed by a computing device comprising at least one processor, the method comprising:
  clustering a set of polymorphic file samples that share a set of static attributes in common with one another;
  computing a distance of the polymorphic file samples from a centroid that represents a reference data point with respect to the set of polymorphic file samples, wherein computing the distance comprises:
    computing, based at least in part on certain static attributes of the polymorphic file samples, a plurality of vectors that represent data points with respect to the centroid;
    calculating an average of the vectors;
    determining that the distance is below a certain threshold by determining that the average of the vectors is within a certain numerical value of the centroid;
  upon determining that the distance is below the certain threshold:
    identifying, within the set of static attributes shared in common by the polymorphic file samples, a subset of static attributes whose values are identical across all of the polymorphic file samples;
    generating a generic file-classification signature from the subset of static attributes.

2. The method of claim 1, wherein clustering the set of polymorphic file samples that share the set of static attributes in common comprises:
  identifying at least one polymorphic variant that has certain static attributes;
  determining that certain static attributes of at least one additional polymorphic variant are identical to the certain attributes of the polymorphic variant;
  in response to determining that the certain attributes of the additional polymorphic variant are identical to the certain attributes of the polymorphic variant, forming a cluster that includes the polymorphic variant and the additional polymorphic variant.

3. The method of claim 2, wherein:
  computing the distance of the polymorphic file samples from the centroid comprises:
    computing a distance of the polymorphic variant from the centroid;
    computing an additional distance of the additional polymorphic variant from the centroid;
  determining that the distance of the polymorphic file samples from the centroid is below the certain threshold comprises:
    determining, based at least in part on the distances of the polymorphic variant and the additional polymorphic variant, a density of the cluster that includes the polymorphic variant and the additional polymorphic variant;
    determining that the density of the cluster satisfies a density threshold indicating that the cluster is qualified for use in generating a generic file-classification signature whose false positive rate is at an acceptable level.

4. The method of claim 1, wherein:
  computing the distance of the polymorphic file samples from the centroid comprises computing, based at least in part on certain static attributes of the polymorphic file samples, a plurality of vectors that represent data points with respect to the centroid;
  determining that the distance of the polymorphic file samples from the centroid is below the certain threshold comprises determining that each of the vectors is within a certain numerical value of the centroid.

5. The method of claim 1, wherein determining that the distance of the polymorphic file samples from the centroid is below the certain threshold comprises determining that the distance of the polymorphic file samples from the centroid is approximately zero.

6. The method of claim 1, wherein:
  clustering the set of polymorphic file samples that share the set of static attributes in common comprises clustering the set of polymorphic file samples on a server;
  generating the generic file-classification signature from the subset of static attributes comprises generating the generic file-classification signature on the server;
  further comprising distributing the generic file-classification signature to at least one client device via a network to enable the client device to classify at least one polymorphic file sample as malware using the generic file-classification signature by comparing certain static attributes of the polymorphic file with the subset of static attributes.

7. A system for automated generation of generic signatures used to detect polymorphic malware, the system comprising:
a clustering module, stored in memory, that clusters a set of polymorphic file samples that share a set of static attributes in common with one another;
a computation module, stored in memory, that computes a distance of the polymorphic file samples from a centroid that represents a reference data point with respect to the set of polymorphic file samples, wherein computing the distance comprises:
computing, based at least in part on certain static attributes of the polymorphic file samples, a plurality of vectors that represent data points with respect to the centroid;
calculating an average of the vectors;
a determination module, stored in memory, that determines that the distance is below a certain threshold by determining that the average of the vectors is within a certain numerical value of the centroid;
an identification module, stored in memory, that identifies, within the set of static attributes shared in common by the polymorphic file samples, a subset of static attributes whose values are identical across all of the polymorphic file samples;
a generation module, stored in memory, that generates a generic file-classification signature from the subset of static attributes;
at least one physical processor that executes the clustering module, the computation module, the determination module, the identification module, and the generation module.

8. The system of claim 7, wherein:
the identification module identifies at least one polymorphic variant that has certain static attributes;
the determination module determines that certain static attributes of at least one additional polymorphic variant are identical to the certain attributes of the polymorphic variant;
the cluster module forms a cluster that includes the polymorphic variant and the additional polymorphic variant in response to the determination that the certain attributes of the additional polymorphic variant are identical to the certain attributes of the polymorphic variant.

9. The system of claim 8, wherein:
the computation module:
computes a distance of the polymorphic variant from the centroid;
computes an additional distance of the additional polymorphic variant from the centroid;
the determination module:
determines, based at least in part on the distances of the polymorphic variant and the additional polymorphic variant, a density of the cluster that includes the polymorphic variant and the additional polymorphic variant;
determines that the density of the cluster satisfies a density threshold indicating that the cluster is qualified for use in generating a generic file-classification signature whose false positive rate is at an acceptable level.

10. The system of claim 9, wherein:
the computation module computes, based at least in part on certain static attributes of the polymorphic file samples, a plurality of vectors that represent data points with respect to the centroid;
the determination module determines that each of the vectors is within a certain numerical value of the centroid.

11. The system of claim 7, wherein the determination module determines that the distance of the polymorphic file samples from the centroid is approximately zero.

12. The system of claim 7, wherein:
the clustering module clusters the set of polymorphic file samples on a server;
the generating module generates the generic file-classification signature on the server;
further comprising a distribution module, stored in memory and executed by the physical processor, that distributes the generic file-classification signature to at least one client device via a network to enable the client device to classify at least one polymorphic file sample as malware using the generic file-classification signature by comparing certain static attributes of the polymorphic file with the subset of static attributes.

13. A non-transitory computer-readable medium comprising one or more computer-executable instructions that, when executed by at least one processor of a computing device, cause the computing device to:
cluster a set of polymorphic file samples that share a set of static attributes in common with one another;
compute a distance of the polymorphic file samples from a centroid that represents a reference data point with respect to the set of polymorphic file samples, wherein computing the distance comprises:
computing, based at least in part on certain static attributes of the polymorphic file samples, a plurality of vectors that represent data points with respect to the centroid;
calculating an average of the vectors;
determine that the distance is below a certain threshold by determining that the average of the vectors is within a certain numerical value of the centroid;
upon determining that the distance is below the certain threshold:
identify, within the set of static attributes shared in common by the polymorphic file samples, a subset of static attributes whose values are identical across all of the polymorphic file samples;
generate a generic file-classification signature from the subset of static attributes.

14. The non-transitory computer-readable medium of claim 13, wherein the one or more computer-executable instructions further cause the computing device to:
identify at least one polymorphic variant that has certain static attributes;
determine that certain static attributes of at least one additional polymorphic variant are identical to the certain attributes of the polymorphic variant;
form a cluster that includes the polymorphic variant and the additional polymorphic variant in response to the determination that the certain attributes of the additional polymorphic variant are identical to the certain attributes of the polymorphic variant.

15. The non-transitory computer-readable medium of claim 14, wherein the one or more computer-executable instructions further cause the computing device to:

compute a distance of the polymorphic variant from the centroid;

compute an additional distance of the additional polymorphic variant from the centroid;

determine, based at least in part on the distances of the polymorphic variant and the additional polymorphic variant, a density of the cluster that includes the polymorphic variant and the additional polymorphic variant;

determine that the density of the cluster satisfies a density threshold indicating that the cluster is qualified for use in generating a generic file-classification signature whose false positive rate is at an acceptable level.

16. The non-transitory computer-readable medium of claim 13, wherein the one or more computer-executable instructions further cause the computing device to:

compute, based at least in part on certain static attributes of the polymorphic file samples, a plurality of vectors that represent data points with respect to the centroid;

determine that each of the vectors is within a certain numerical value of the centroid.

17. The non-transitory computer-readable medium of claim 13, wherein the one or more computer-executable instructions further cause the computing device to determine that the distance of the polymorphic file samples from the centroid is approximately zero.

* * * * *